United States Patent [19]

Omori et al.

[11] 3,910,240
[45] Oct. 7, 1975

[54] ELECTRONICALLY CONTROLLED FUEL INJECTION SYSTEM

[75] Inventors: Norio Omori, Kariya; Katsuhiko Oiwa, Handa, both of Japan

[73] Assignee: Nippondenso Co., Ltd., Kariya, Japan

[22] Filed: Sept. 28, 1973

[21] Appl. No.: 401,716

[30] Foreign Application Priority Data

Oct. 3, 1972  Japan.............................. 47-99562

[52] U.S. Cl. ................ 123/32 EA; 60/276; 60/285
[51] Int. Cl............................. F02d 5/02; F02b 3/00
[58] Field of Search........... 123/32 EA; 60/276, 285

[56] References Cited
UNITED STATES PATENTS

| | | | |
|---|---|---|---|
| 3,738,341 | 6/1973 | Loos | 60/276 |
| 3,745,768 | 7/1973 | Zechnall | 123/32 EA |
| 3,827,237 | 8/1974 | Linder | 60/285 |

*Primary Examiner*—Charles J. Myhre
*Assistant Examiner*—Ronald B. Cox
*Attorney, Agent, or Firm*—Cushman, Darby & Cushman

[57] ABSTRACT

In an electronically controlled fuel injection system comprising an electromagnetically operable fuel injection valve disposed in each of the inlet pipes for engine cylinders, wherein the injection valves and the exhaust pipes are divided into two groups, and an oxygen concentration detector is provided in the exhaust pipe in one of the two groups, whereby a voltage generated by the detector in accordance with the oxygen concentration is applied to an electronic control unit to control the electric pulse for the injection valve in the group corresponding to the exhaust pipe which is provided with the detector, while a voltage corresponding to an operating parameter of the engine is applied to the electronic control unit and the electric pulses for the injection valves in the other group are multiplied by a value corresponding to the operating parameter of the engine and the resultant electric pulses are supplied to the injection valves in the other group.

4 Claims, 11 Drawing Figures

ELECTRONICALLY CONTROLLED FUEL INJECTION SYSTEM

BACKGROUND OF THE INVENTION

1. Field of the Invention

The present invention relates to electronically controlled fueld injection systems for internal combustion engines and more particularly to an electronically fuel injection system of the type comprising an electromagntically operable injection valve disposed in the vicinity of the inlet valve of each cylinder, and an electronic control unit for opening the injection valves in synchronism with the rotation of the crankshaft of the engine by means of electric pulses, the time width of the electric pulses corresponding to an operating parameter of the engine, such as, the number of revolutions of the engine, the pressure in the inlet pipe or the position of a baffle plate for checking the flow of air which is provided upstream of a throttle valve and which is controlled to keep constant the difference between the pressures on both sides of the baffle plate, wherein an oxygen concentration detector consisting of an oxide of metal such as zirconium dioxide or titanium dioxide is provided in a portion of an exhaust pipe, whereby an electromotive force generated by the metal oxide is fed back to the electronic control unit so as to correct the electric pulses for opening the injection valves.

2. Description of the Prior Art

When the above-mentioned metal oxides are heated to elevated temeratures, these oxides act as electrolytes for oxygen ions so that the movement of the oxygen ions generates an electromotive force when there is a difference between the oxygen concentrations on the sides of the partition of such metal oxide. On the other hand, depending on the ratio by weight of the fuel to air in the mixture or the air-fuel ratio, the exhaust gases from the engine contain carbon monoxide and oxygen as shown in FIG. 1. Therefore, if such a metal oxide is heated to an elevated temperature (e.g., 700°C), an electromotive force is produced as shown in FIG. 2. A known type of electronically controlled fuel injection system in which the electromotive force produced by a metal oxide as shown in FIG. 2 is fed back to an electronic control unit of the type described above to control the quantity of fuel injected, has many distinguishing features that it is not necessary to compensate for changes in the external conditions, e.g., the atmospheric pressure or air temperature, that there is no need for adjustments to meet variations with different engines, that there is no need for adjustments due to the wear, deterioration, poor maintenance or the like of the engine, and that the construction of the system is therefore simplified with resultant great decrease in the manufacturing cost and so on. These features must, however, be offset by the following drawbacks. That is, as will be seen from FIG. 2, the amount of electromotive force varies sharply within a narrow range of the theoretical air-fuel ratios with the result that the fuel injection quantity can be generally controlled only to such narrow range of air-fuel ratios and controlled air-fuel ratio setting cannot be changed as desired to meet different operating conditions.

SUMMARY OF THE INVENTION

It is the object of the present invention to provide an electronically controlled fuel injection system of a construction which overcomes the foregoing difficulty. In accordance with the present invention, there is thus provided an electronically controlled fuel injection system for a multicylinder internal combustion engine wherein the exhaust pipes for engine cylinders are divided into two groups in the vicinity of exhaust valves with one of the groups including at least one exhaust pipe and at least one of the cylinders and provided with an oxygen concentration detector provided in the exhaust pipe, while injection valves positions in the vicinity of inlet valves are divided into two groups corresponding to the two groups of the exhaust pipes, whereby the injection valve corresponding to the exhaust pipe in one group provided with the oxygen concentration detector is supplied with electric pulses having a first time width which is determined by feeding back the elctromotive force of the oxygen concentration detector to an electronic control unit, while the remaining injection valves receive electric pulses having a second time width which is the second time width multiplied by a value $k$ (The magnitude of $k$ may be constant in the range from about 0.7 to 1.3 or it may be a variable related to any other operating parameter of the engine and in the illustrated embodiment of this invention, the air pressure in the inlet pipe is used as the engine operating parameter). Thus, the system according to the present invention has a remarkable advantage in that any desired overall air-fuel ratio can be selected while making the best use of the advantages of the above-described feedback mechanism.

DESCRIPTION OF THE PREFERRED EMBODIMENT

Figure 1:
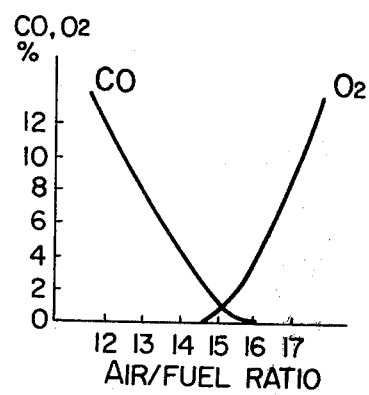
FIG. 1 is a graph showing the relationship between the air-fuel ratio and the amount of carbon monoxide and oxygen contained in the exhaust gases.

The fuel injection system of this invention will now be described in greater detail. The fuel injection system is used in the operation of a multicylinder engine having an inlet pipe which supplies substantially the same amount of air to each cylinder, and the exhaust pipes for the engine cylinders are divided in the vicinity of the exhaust valves of the cylinders into a first group including at least one cylinder and a second group including the remaining cylinders with an oxygen concentration detector comprising a metal oxide being disposed in the exhaust pipe belonging to the first group. (The two groups of the exhaust pipes may be combined into a single exhaust pipe at a place sufficiently downstream of the mounting position of the oxygen concentration detector.) On the other hand, injection valves positioned in the vicinity of inlet valves are divided into two groups corresponding to the two groups of the exhaust pipes, whereby electric pulses having a time width $t1$ which is determined by feeding back the electromotive force produced by the oxygen concentration detector to an electronic control unit are applied to the injection valve corresponding to the group including the exhaust pipe which is equipped with the oxygen concentration detector. In other words, the cylinder belonging to this group receives at all times a mixture slightly leaner than the theoretical air-fuel ratio irrespective of the external conditions, etc. The injection valves for the remaining cylinders receive electric pulses having a time width $kt1$ obtained by multiplying the pulse time width $t1$ with a value $k$. Here, the value of $k$ may be constant in the range from about 0.7 to 1.3 or alternately it may be a variable related to any other operating parameter of the engine (e.g., the output of a pressure sensor positioned in the inlet pipe).

In an illustrative case of the system of the invention used in the operation of a four-cylinder internal combustion engine, the exhaust pipe for one of the cylinders may be divided from the rest and provided with an oxygen concentration detector to thereby apply electric pulses having a time width $t1$ to the injection valve of the cylinder corresponding to the said exhaust pipe. In this case, the mixture supplied to that cylinder has an air-fuel ratio of for example 14.8 which is slightly leaner than the theoretical air-fuel ratio. If the value of $k$ is assumed to be 0.85 and if electric pulses having a time width $0.85 \times t1$ are applied to the injection valves for the three remaining cylinders, a mixture having an air-fuel ratio of 17.4 is supplied to each of the three cylinders. The overall fuel economy is the same as in thee usual case, since the exhaust gases produced at a downstream point where the exhaust pipes provided for the individual cylinders converge, substantially correspond to those which occur when the mixture having an air-fuel ratio 16.7 is supplied to all of the four cylinders. If the value of $k$ is made greater than unity, the overall air-fuel ratio becomes richer than the theoretical air-fuel ratio.

With the construction described above, it is possible to obtain a degree of freedom for the controlled air-fuel ratio by means of feedback. An embodiment of the system of the present invention incorporating this construction will now be described with reference to FIG. 3 et sequens the accompanying drawings.

Figure 2:
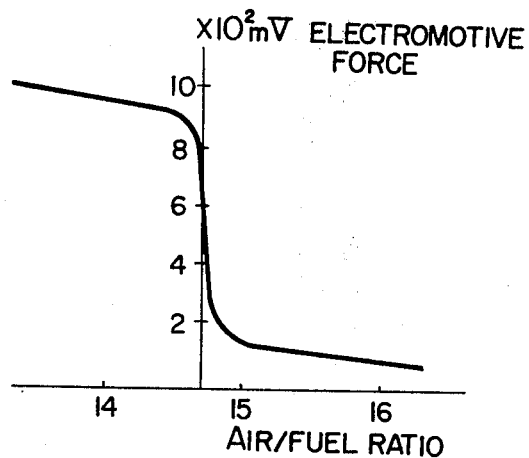
FIG. 2 is a graph showing the relationship between the air-fuel ratio and the electromotive force generated by the oxygen concentration detector corresponding to the oxygen concentration in the exhaust gases.
Figure 3:
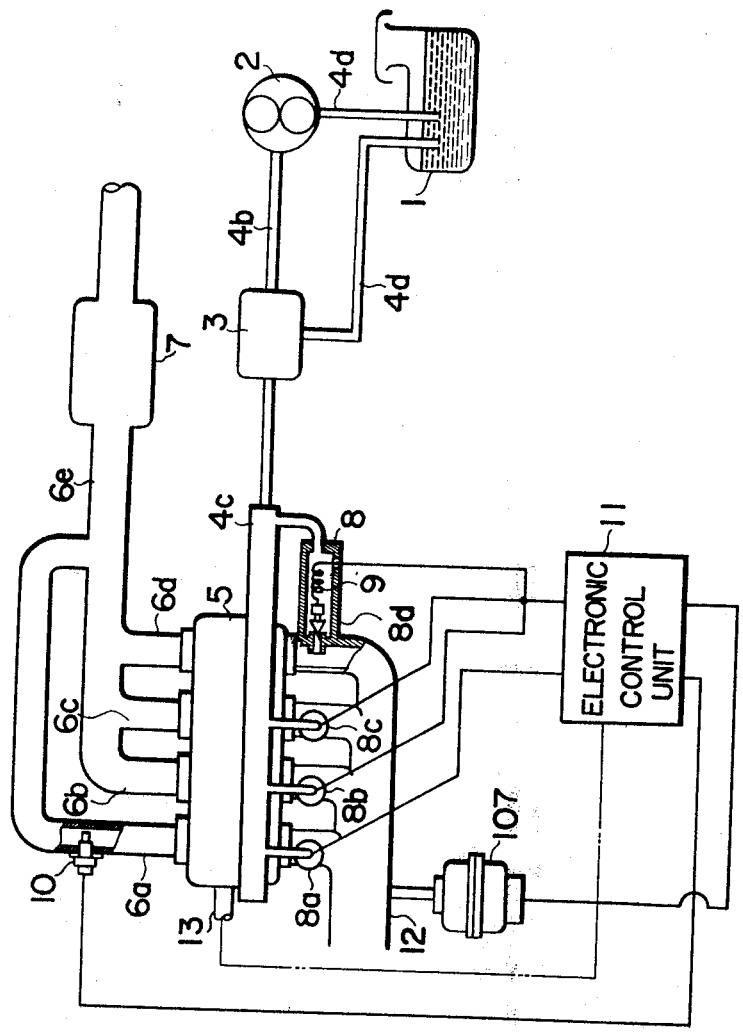
FIG. 3 is a schematic diagram showing part in section an embodiment of an electronically controlled fuel injection system according to the present invention.

Referring first to FIG. 3, numeral 1 designates a fuel tank, 2 a pump, 3 a pressure regulator. These elements are interconnected by means of fuel lines 4a, 4b and 4c. The pressure in the fuel 4b and 4c is maintained constant by the pressure regulator 3. Numeral 5 designates a four-cylinder internal combustion engine in which the exhaust pipes for cylinders are divided into a first group comprising an exhaust pipe 6a a second group comprising exhaust pipes 6b, 6c and 6d in the vicinity of exhaust valves (not shown) and all of these exhaust pipes are converged into an exhaust pipe 6e which is opened to the atmosphere through a muffler 7. Numeral 8 generally designates injection valves positioned in the vicinity of inlet valves (not shown) and each comprising an electric winding 9. The injection valves are divided into a first group comprising an injection valve 8a and a second group comprising injection valves 8b, 8c and 8d to correspond with the first and second groups of the exhaust pipe, respectively. Numeral 10 designates an oxygen concentration detector comprising a metal oxide which is provided in the exhaust pipe 6a of the divided exhaust pipes for the cylinders which belongs to the group including a smaller number of the cylinders. When heated to elevated temperatures, the oxygen concentration detector 10 generates an electromotive force which is dependent on the air-fuel ratio of a mixture as shown in FIG. 2. Numeral 107 designates a pressure sensor for detecting the pressure of air in the inlet pipe, 11 an electronic control unit, 12 an inlet pipe, 13 an engine crankshaft.

Figure 4:
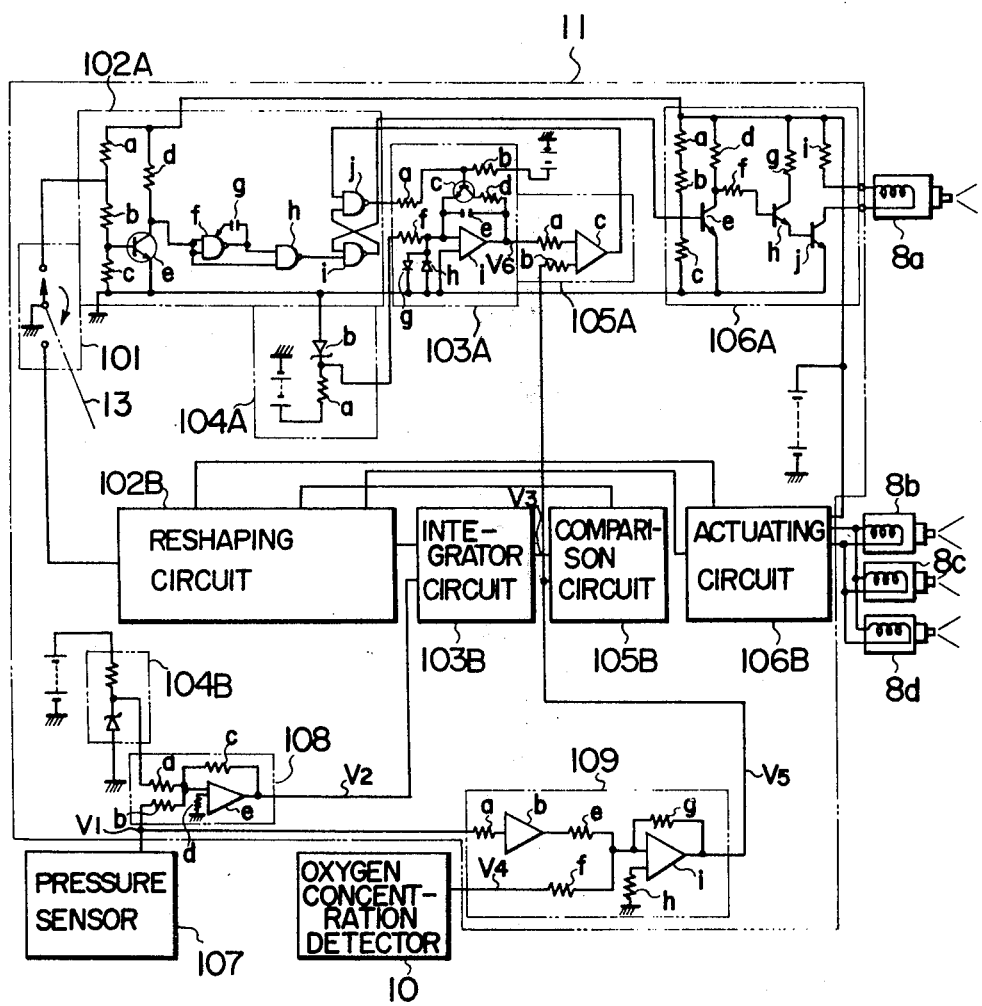
FIG. 4 is an electric wiring diagram of the electronic control unit used in the embodiment of FIG. 3 to control the injection of fuel.

An embodiment of the electronic control unit 11 for controlling the injection of fuel to the injection valves 8a, 8b, 8c and 8d will be described with reference to FIG. 4 in which numeral 101 designates a contact unit which is synchronized with the rotation of the engine to provide fuel injection start signals for the electromagnetically operable fuel injection valves 8a to 8d.

The circuit construction for providing an electric pulse signal of a time width $t1$ for the injection valve 8a will now be described. Numeral 102A designates a reshaping circuit in which numerals 102Aa, 102Ab, 102Ac and 102Ad designate resistors, 102Ag a capacitor, 102Af to 102Aj NAND circuits, 102Ae a transistor. Numeral 103A designates an integrator circuit in which 103Aa, 103Ab, 103Ad and 103Af designate resistors, 103Ac a transistor, 103Ag and 103Ah diodes, 103Ai an operational amplifier, whereby when the output of the NAND circuit 102Aj is 0, the operation of integration is effected, whereas when the output of the NAND circuit 102Aj is 1, the discharging occurs. The integrator circuit 103A integrates a voltage which is determined by a resistor 104Aa and a Zener diode 104Ab of a voltage regulator circuit 104A. Numeral 105A designates a comparison circuit in which numerals 105Aa and 105Ab designate resistors, 105Ac a comparator. The comparator 105Ac compares the output voltage of the integrator circuit 103A with the output voltage of a control circuit that will be described later, whereby when the former output voltage is lower than the latter, the output of the comparison circuit 105A is 1, while its output is 0 when the former output voltage is higher than the latter. Numeral 106A designates an actuating circuit in which numerals 106Aa, 106Ab, 106Ac, 106Ad, 106Af, 106Ag and 106Ai designate resistors, and 106Ae, 106Ah and 106Aj designate transistors.

Numerals 102B, 103B, 104B, 105B and 106B designate circuits which are respectively of the same construction as the reshaping circuit 102A, integrator circuit 103A, voltage regulator circuit 104A, comparison circuit 105A and actuating circuit 106A and these circuits are used to apply electric pulses to the injection valves 8b, 8c and 8d. However, the voltage integrated by the integrator circuit 103B is the sum of the output voltages of the voltage regulator circuit 104B and the pressure sensor 107, that is, the output voltage of an adder 108 is integrated. In the adder 108, numerals 108a, 108b, 108c and 108d designate resistors, 108e an operational amplifier. Numeral 109 designates a control circuit in which numerals 109a, 109f, 109g and 109h designate resistors, 109b and 109i operational amplifiers with the operational amplifier 109b being used for amplification purposes and the operational amplifier 109i for addition purposes.

Figure 5:
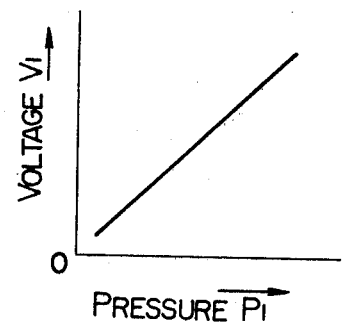
FIG. 5 is a characteristic diagram showing the relationship between the air pressure in the inlet pipe and the output of the pressure sensor in the embodiment of FIG. 3.
Figure 6:
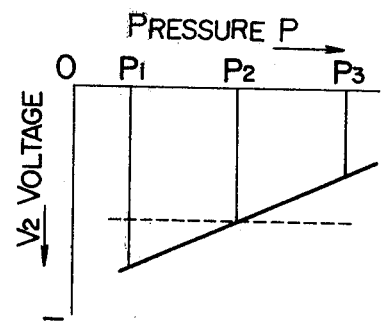
FIG. 6 is a characteristic diagram showing the relationship between the air pressure in the inlet pipe and the output of the adder in the embodiment of FIG. 3.
Figure 7:
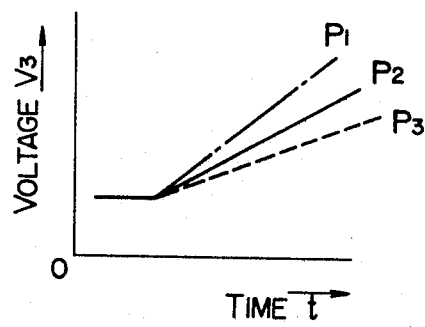
FIG. 7 is a characteristic diagram showing the relationship between the time and the output of the integrator circuit in the embodiment of FIG. 3 with the inlet pipe air pressure being used as an operating parameter of the engine.
Figure 8:
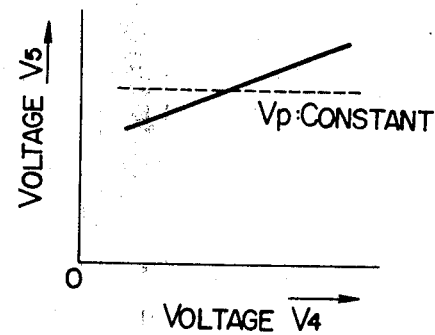
FIG. 8 is a characteristic diagram showing the relationship between the outpout of the oxygen concentration detector and the output of the control circuit in the embodiment of FIG. 3 with the inlet pipe air pressure being constant.
Figure 9:
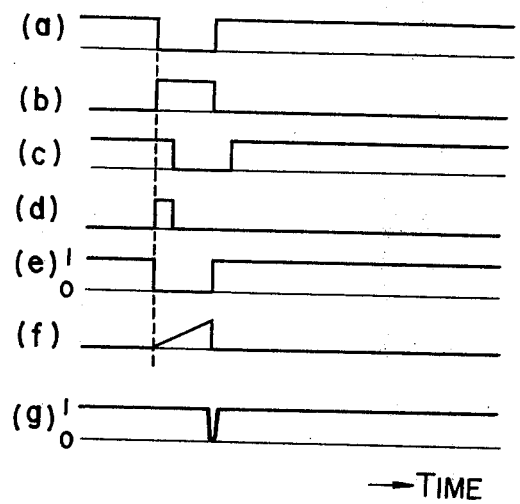
FIG. 9 is a waveform diagram showing the waveforms generated at various points in the electronic control unit of this embodiment shown in FIG. 4.
Figure 10A:
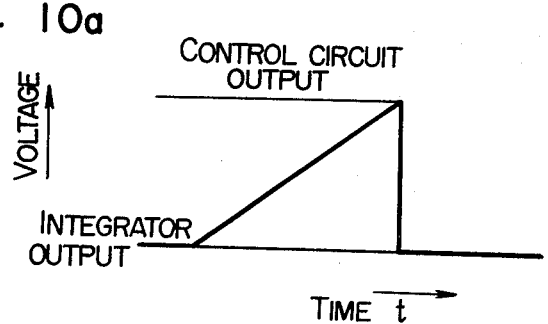
FIG. 10a and 10b are waveform diagrams for explaining the operation of the comparison circuit in the embodiment of FIG. 3.
Figure 10B:

The operation of the electronic control unit 11 constructed as above described will be explained with reference to FIG. 5 et sequens. FIG. 5 shows the relationship between the air pressure in the inlet pipe and the output voltage $V_1$ of the pressure sensor 107 and the output voltage $V_1$ increases as the air pressure becomes higher. FIG. 6 shows the relationship between the output voltage $V_2$ of the adder 108 and the inlet pipe air pressure. FIG. 7 shows the inlet pipe air pressure and the output voltage $V_3$ of the integrator circuit 103A with the abscissa indicating the time. That is, the higher the air pressure is, the slope of the output voltage $V_3$ of the integrator circuit 103A will become more gradual. In other words, as compared with the output pulse width (the fuel injection time duration) of the actuating circuit 106A, the output pulse width of the actuating circuit 106B becomes longer (the fuel injection time duration becomes longer) as the air pressure increases, while it becomes shorter as the air pressure decreases. FIG. 8 shows the relationship between the output voltage $V_4$ of the oxygen concentration detector 10 and the output voltage $V_5$ of the control circuit 109 with the air pressure being constant, and the control voltage is increased when the output voltage $V_4$ of the detector 10 is high, i.e., when the air-fuel ratio A/F is leaner than 14.8. FIG. 9 shows the waveforms generated at various points of the electronic control unit 11. FIG. 9a shows the voltage at the contact unit 101, FIG. 9b shows the collector voltage of the transistor 102Ae in the reshaping circuit 102A, FIG. 9c shows the output voltage of the NAND circuit 102Af in the reshaping circuit 102A, FIGS. 9d and 9e show respectively the output voltages of the NAND circuits 102Ah and 102Aj in the reshaping circuit 102A. FIG. 9f shows the output voltage of the integrator circuit 103A, and FIG. 9g shows the output voltage of the comparator 105Ac in the comparison circuit 105A. Of FIGS. 10a and 10b, FIG. 10b is a diagram for explaining the operation of the comparion circuit 105A, in which the abscissa incicates the time and the ordinate indicates the output voltage of the comparator 105Ac. When the output of the integrator circuit 103A reaches the output of the control circuit 109, the output of the comparator 105Ac momentarily changes to 0 and the output of the NAND circuit 102Aj of the reshaping circuit 102A is changed as shown in FIG. 9e. The purpose of this operation is that the injection of fuel from the injection valve 8a started by the signal of the NAND circuit 102Aj subsequent to the closing of the contacts for the injection valve 8a, may be stopped when the output of the NAND circuit 102Aj is changed.

What is claimed is:

1. An electronically controlled fuel injection system for an internal combustion engine comprising: an electromagnetically operable fuel injection valve provided in the inlet pipe for each cylinder, and an electronic control unit for controlling the duration of the opening of said injection valves with electric pulses having a time width corresponding to an operating parameter of an engine and in synchronism with the rotation of a crankshaft of said engine, wherein said injection valves are divided into two groups, said cylinders and exhaust pipes for said cylinders are divided into two groups corresponding to said two groups of said injection valves, and an oxygen concentration detector is provided in said exhaust pipe in one of said two groups including at least one of said cylinders, whereby a voltage generated by said detector in accordance with the oxygen concentration in exhaust gases is applied to said electronic control unit to control an electric pulse applied to said injection valve corresponding to said exhaust pipe provided with said detector, while a voltage corresponding to an operating parameter of said engine is applied to said electronic control unit and an electric pulse obtained by multiplying said first-mentioned electric pulse by a value corresponding to said operating parameter of said engine is applied to the rest of said injection valves.

2. An electronically controlled fuel injection system for an internal combustion engine comprising an electromagnetically operable fuel injection valves provided in the inlet pipe for each cylinder,
    means for detecting oxygen concentration in the exhaust pipe,
    an electronic control unit connected to said electromagnetically operable fuel injection valves and to an engine parameter sensing means for controlling the duration of the opening of said injection valves in response to operating parameters of the engine and in synchronism with the engine rotation, said electronic control unit including: first means connected to said oxygen concentration detecting means for providing an electric pulse signal of a first time width in response to the oxygen concentration and second means connected to said oxygen concentration detecting means and to said engine parameter sensing means for providing an electric pulse signal of a second time width, said second time width being $k$ times said first time width, $k$ being in the range of 0.7 to 1.3, whereby air-fuel ratio is selected.

3. An electronically controlled fuel injection system for an internal combustion engine as claimed in claim 2, wherein
    said first means comprises:
    a contact unit for providing fuel start signals in synchronizm with the rotation of the engine,
    a reshaping circuit connected to said contact unit for reshaping said fuel start signals,
    a voltage regulator circuit for providing a constant voltage,
    an integrator circuit connected to said reshaping circuit and said voltage regulator circuit for integrating the constant voltage of said voltage regulator with the time interval determined by the reshaped signal, a comparison circuit connected to said integrator circuit and said oxygen concentration detecting means for providing a signal when the output of the integrator circuit reaches the output of said oxygen concentration detecting means, and a valve actuating circuit connected to said reshaping circuit for controlling said fuel injection valves in response to the output signal of said comparison circuit.

4. An electronically controlled fuel injection system for an internal combustion engine comprising an electromagnetically operable fuel injection valves provided in the inlet pipe for each cylinder, means for detecting oxygen concentration in an exhaust pipe, and an electronic control unit connected to said electromagnetically operable fuel injection valves, said oxygen concentration detecting means and to an engine parameter sensing means for controlling fuel injection, wherein said electronic control unit comprises first means connected to said oxygen concentration detecting means for controlling fuel amount injected into a first group of cylinders, second means connected to said engine parameter sensing means for controlling fuel amount injected into a second group of cylinders in a different manner from said first means, said oxygen concentration detecting means being disposed in the exhaust pipe which solely belongs to said first group of cylinders.

* * * * *